United States Patent
Lee et al.

(10) Patent No.: US 7,540,077 B2
(45) Date of Patent: Jun. 2, 2009

(54) METHOD FOR BONDING SLIDER ROW BARS FOR PHOTOLITHOGRAPHY PROCESS

(75) Inventors: TaiBoon Lee, HongKong (CN); YongPing Gao, DongGuan (CN)

(73) Assignee: SAE Magnetics (H.K.) Ltd., Hong Kong (HK)

(*) Notice: Subject to any disclaimer, the term of this patent is extended or adjusted under 35 U.S.C. 154(b) by 291 days.

(21) Appl. No.: 11/540,690

(22) Filed: Oct. 2, 2006

(65) Prior Publication Data
US 2008/0078077 A1 Apr. 3, 2008

(51) Int. Cl.
*G11B 5/127* (2006.01)
*H04R 31/00* (2006.01)

(52) U.S. Cl. .............. 29/603.12; 29/417; 29/603.04; 29/603.06; 29/603.2; 156/89.11; 156/89.12; 156/268; 156/344; 360/235.7; 360/235.8; 360/236.3; 360/236.5; 360/236.6; 438/455; 438/458; 438/976; 451/5; 451/41

(58) Field of Classification Search ............... 29/417, 29/603.06, 603.12, 603.2, 844; 156/89.11, 156/89.12, 268, 344; 360/235.7, 235.8, 236.3, 360/236.5, 236.6, 237; 438/455, 458, 976; 427/207.1–208.8; 451/5, 41
See application file for complete search history.

(56) References Cited

U.S. PATENT DOCUMENTS

| | | | | | |
|---|---|---|---|---|---|
| 5,516,430 | A | * | 5/1996 | Hussinger | 216/36 |
| 6,129,855 | A | * | 10/2000 | Sawada et al. | 216/22 |
| 6,687,976 | B1 | * | 2/2004 | Koyama et al. | 29/603.12 |

* cited by examiner

*Primary Examiner*—Paul D Kim
(74) *Attorney, Agent, or Firm*—Nixon & Vanderhye P.C.

(57) ABSTRACT

A method for bonding slider row bars for photolithography process, includes steps of: providing a first carrier plate having a sticky surface; providing slider row bars each having a first surface for forming ABS and an opposite second surface, and securing each slider row bar to the first carrier plate with its first surface facing the sticky surface; providing an encapsulation glue and dispensing it to the second surfaces and gaps between the slider row bars; providing a second carrier plate and attaching it to the second surfaces through the encapsulation glue; irradiating the first carrier plate and the encapsulation glue with ultraviolet light such that the first carrier plate is removed from the slider row bars, and the encapsulation glue is cured to bond the slider row bars with the second carrier plate together.

13 Claims, 20 Drawing Sheets

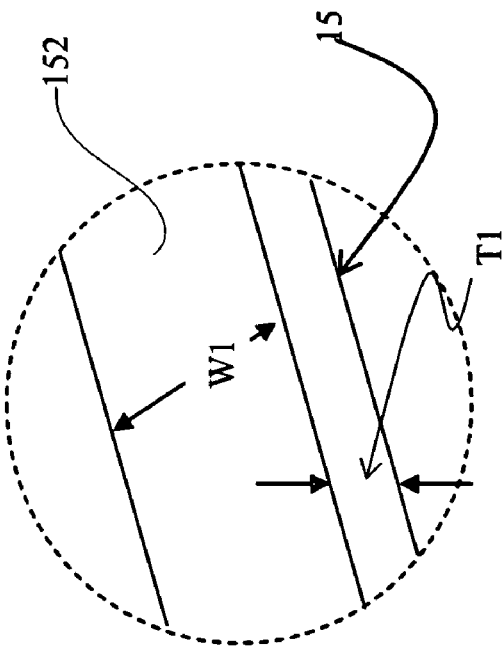
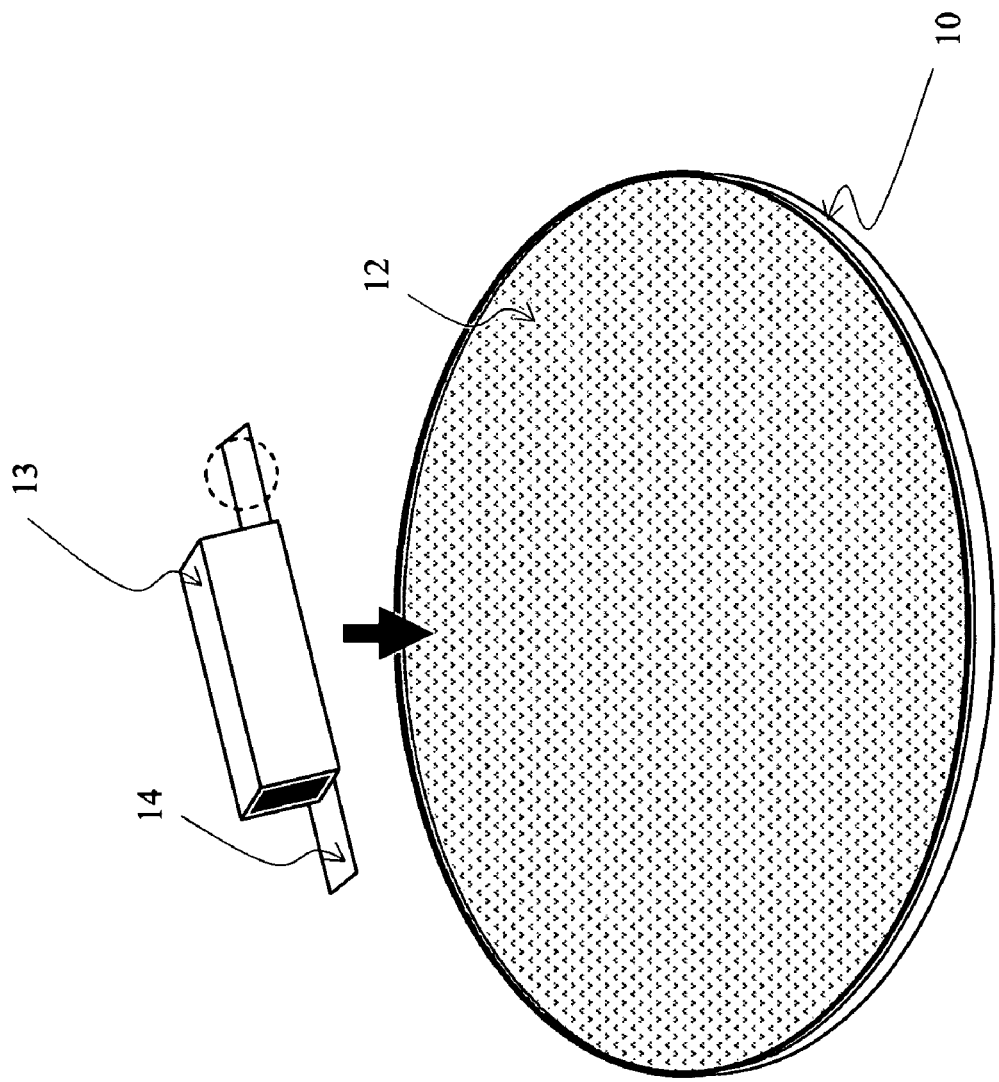
Fig. 6b
Fig. 6a

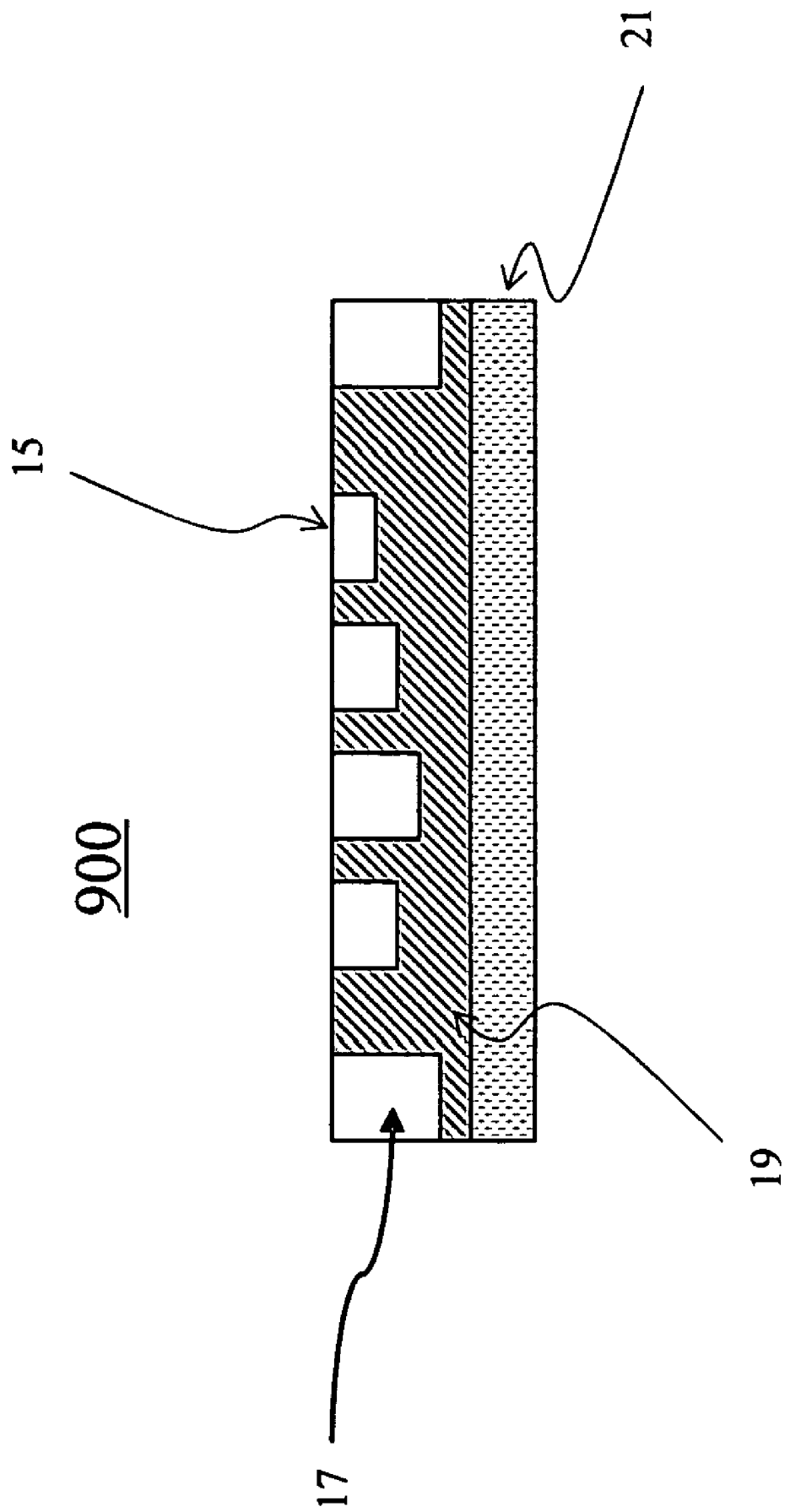

METHOD FOR BONDING SLIDER ROW BARS FOR PHOTOLITHOGRAPHY PROCESS

FIELD OF THE INVENTION

The present invention relates to a method of manufacturing sliders used in information recording disk drive units, and more particularly to a method of bonding slider row bars for photolithography process.

BACKGROUND OF THE INVENTION

One known type of information storage device is a disk drive device. FIG. 1a illustrates a conventional disk drive device 200 and shows a magnetic disk 101 mounted on a spindle motor 102 for spinning the disk 101. A voice coil motor arm 104 carries a head gimbal assembly (HGA) 100 that includes a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103 and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 1b illustrates a perspective view of the slider shown in FIG. 1a in a bottom view. As illustrated, a magnetic reading/writing head 116, which is used for realizing data reading/writing operation of the slider relative to the disk 101, is formed on one side surface of the slider 103. The slider 103 has an air bearing surface (ABS) 117 facing to the disk 101. When the disk drive device is in operation, an aerodynamic interaction is generated between the ABS 117 of the slider 103 and the rotary disk 101 in a high speed, thus making the slider 103 floating over the disk 101 dynamically to perform data reading/writing operation.

To make the slider read data from or write data to the disk successfully, the slider is required to have a good flying stability. Manufacturing accuracy of the ABS of the slider is a key factor to influence the flying stability of the slider. Higher manufacturing accuracy of the ABS can make actually manufactured slider ABS be closer to its ideal value in physical dimension, and accordingly, flying parameters of the slider during flying process are closer to their design value. Now a slider ABS forming process is described in brief as follows.

Generally, a slider ABS manufacturing process is based on a plurality of slider row bars, each of which is constructed by a plurality of slider bodies. These slider row bars are encapsulated together to form an entire row bar assembly. After being processed, these row bar assemblies are separated from each other and finally each of these row bar assemblies is cut into separate sliders. FIGS. 2a-2b show a slider row bar used for forming sliders. As shown in the figures, the slider row bar 2 has a width W and a thickness T. The slider row bar 2 has a first surface 3 to form an ABS and a second surface 4 opposite to the first surface 3. The ABS is formed by processing the first surfaces 3 of the encapsulated row bars 2 using photolithography and vacuum etching method in sequence.

In above manufacturing process, the overall flatness of the first surface of the encapsulated row bars has a big influence on manufacturing accuracy of the slider ABS. More concretely, if the overall flatness is high, the later-formed ABS will suffer less distortion in shape, and accordingly, the ABS will achieve a higher manufacturing accuracy. Therefore, the slider can obtain a good flying stability, and the disk drive can achieve a good flying performance. In related art, to improve the overall flatness, a method in which the first surface (ABS forming surface) of the slider row bar is taken as datum surface for bonding the row bars together for a photolithography process is used. Now this method is described as follows.

As shown in FIG. 3, a conventional method for bonding slider row bars comprises the following steps: forming a holding device having a sticky surface (step 101); providing a plurality of slider row bars, each slider row bar having a first surface for forming an ABS and a second surface opposite to the first surface, and securing each slider row bar to the holding device such that the first surface facing the sticky surface (step 102); bonding the slider row bars together via an encapsulation glue to form a slider row bar combination (step 103); providing a carrier and attaching it to the second surfaces of the slider row bar via an adhesive (step 104); and removing the holding device (step 105).

Here, the holding device is used as a temporary carrier tool for temporarily carrying the slider row bars. It is necessary to remove the holding device away from the slider row bars when the whole manufacture process ends (i.e., the above-mentioned step 105). In foregoing conventional method, the holding device is immersed into a special solution such that the sticky surface lose stickiness due to resolving action, and consequently, the holding device is separated from the slider row bars. However, during immersing period, as the slider row bars are also immersed into the solution, the slider row bars are extremely possible to be damaged by erosion of the solution. In addition, in the steps 103 and 104, both curing processes of the encapsulation glue and the adhesive take a certain time respectively, and since the two steps are not performed at the same time, the encapsulation glue and the adhesive cannot be cured at the same time, thus resulting in time waste and finally lowering overall production efficiency.

Thus, it is desired to provide a method for bonding slider row bars to overcome the above-mentioned drawbacks.

SUMMARY OF THE INVENTION

One object of the invention is to provide a method for bonding a plurality of slider row bars for photolithography process, which can greatly improve flatness of ABS-forming surface of the bonded slider row bars.

Another object of the invention is to provide a method for bonding a plurality of slider row bars for photolithography process, which can reduce or avoid damage to the slider row bars during manufacturing process.

Yet another object of the invention is to provide a method for bonding a plurality of slider row bars for photolithography process, which can improve entire production efficiency.

Another object of the invention is to provide a method for manufacturing sliders, which can improve manufacturing precision of the sliders.

To achieve the above objects, a method for bonding slider row bars for photolithography process, comprises steps of: (1) providing a first carrier plate having a sticky surface; (2) providing a plurality of slider row bars, each slider row bar having a first surface for forming ABS and a second surface opposite to the first surface, and securing each slider row bar to the first carrier plate with its first surface facing the sticky surface; (3) providing an encapsulation glue and dispensing it to the second surface of each slider row bar and gaps between the slider row bars; (4) providing a second carrier plate and attaching it to the second surfaces of the slider row bars through the encapsulation glue; (5) irradiating the first carrier plate and the encapsulation glue with ultraviolet light so that the first carrier plate is removed from the slider row bars, and the encapsulation glue is cured to bond the slider row bars with the second carrier plate together.

In an embodiment of the invention, the step (1) comprises steps of: (a) providing a first carrier plate having a datum surface; (b) laminating an adhesive film on the datum surface as the sticky surface of the first carrier plate; (c) removing the adhesive film along the perimeter of the first carrier plate.

The step (3) may comprise: (i) attaching an auxiliary encapsulation plate having an opening to the adhesive film of the first carrier plate, such that the slider row bars are exposed from the opening; (ii) providing an encapsulation glue and dispensing it into the opening to make the encapsulation glue flow to the second surfaces of the slider row bars and gaps between the slider row bars. The encapsulation glue may be ultraviolet-curing glue. The auxiliary encapsulation plate may be made of one kind of material, such as ceramic, stainless steel, polymer or plastic, for providing sufficient structural stiffness.

The step (5) comprises steps of: irradiating the first carrier plate and the encapsulation glue with ultraviolet light to make the adhesive film of the first carrier plate lose stickiness, and make the encapsulation glue being cured to bond the slider row bars with the second carrier plate together; removing the first carrier plate from the slider row bars.

A method for manufacturing sliders comprises steps of: (1) providing a first carrier plate having a sticky surface; (2) providing a plurality of slider row bars, each slider row bar having a first surface for forming ABS and a second surface opposite to the first surface, and securing each slider row bar to the first carrier plate with its first surface facing the sticky surface; (3) providing an encapsulation glue and dispensing it to the second surface of each slider row bar and gaps between the slider row bars; (4) providing a second carrier plate and attaching it to the second surfaces of the slider row bars through the encapsulation glue; (5) irradiating the first carrier plate and the encapsulation glue with ultraviolet light such that the first carrier plate is removed from the slider row bars, and the encapsulation glue is cured to bond the slider row bars with the second carrier plate together; (6) etching the first surfaces of the slider row bars; (7) cutting the slider row bars into separate sliders.

As the invention utilizes the ABS forming surface of the slider row bar as the datum surface, a high overall flatness for the ABS forming surfaces is obtained during encapsulating process. Furthermore, since connection between the slider row bars and the temporary carrying tool (the first carrier plate) is eliminated by irradiation (non-immersing manner), damage to the sliders is reduced or avoided during the manufacturing process. Furthermore, as the process of bonding the slider row bars together occurs at the same time as that of bonding the slider row bars with the second carrier plate, the entire work time is decreased and the production efficiency is improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective view of a slider of the disk drive device shown in FIG. 1a;

FIG. 2b is an enlarged view of portion A of the slider row bar shown in FIG. 2a;

FIGS. 6a-6c are sequential views, illustrating a process of attaching a plurality of slider row bars to the first carrier plate provided by the process shown in FIGS. 5a-5c;

FIG. 9b shows a state after the first carrier plate is removed from the structure shown in FIG. 9a;

DETAILED DESCRIPTION OF THE INVENTION

Figure 1A:
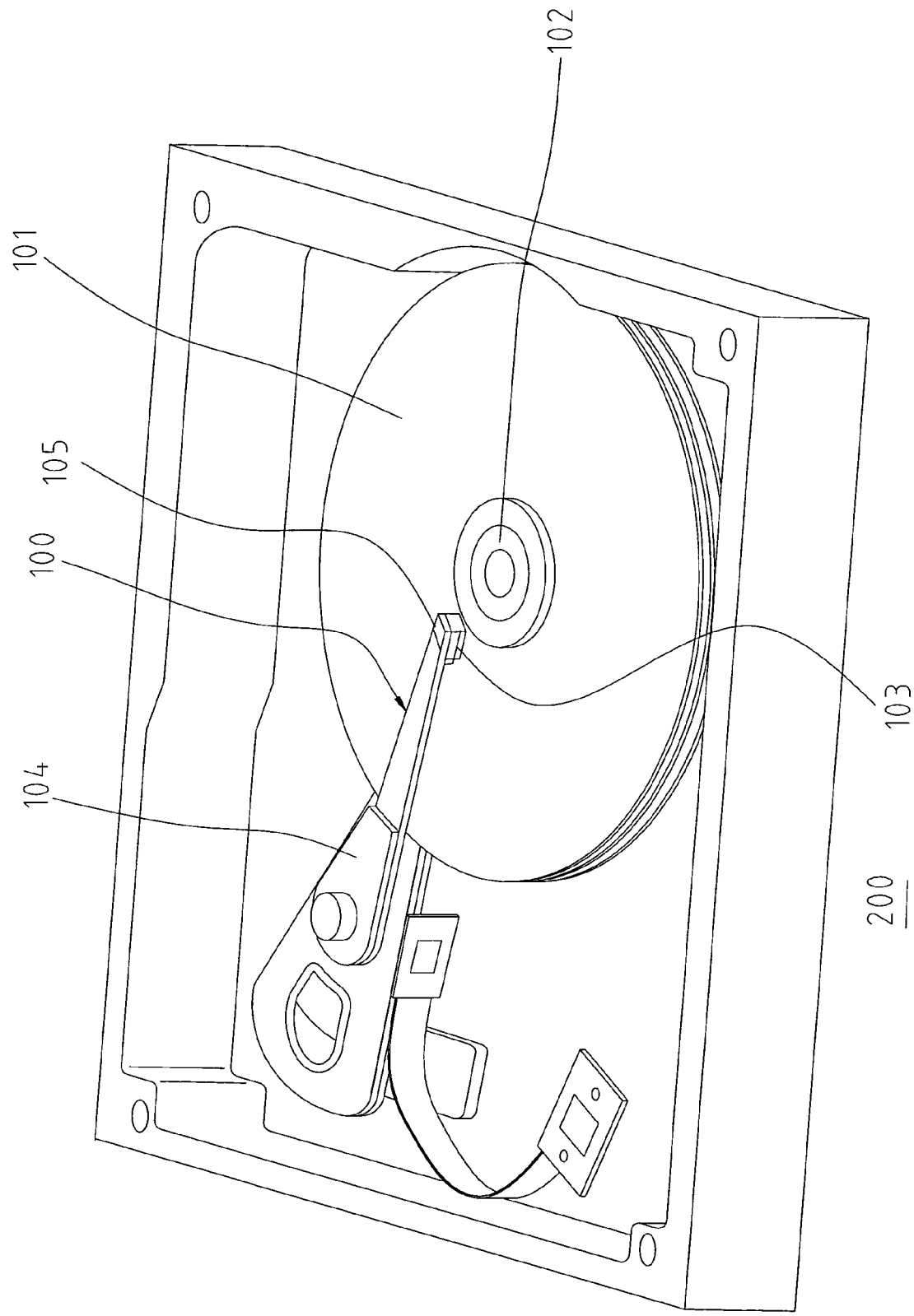
FIG. 1a is a perspective view of a conventional disk drive device.
Figure 1B:
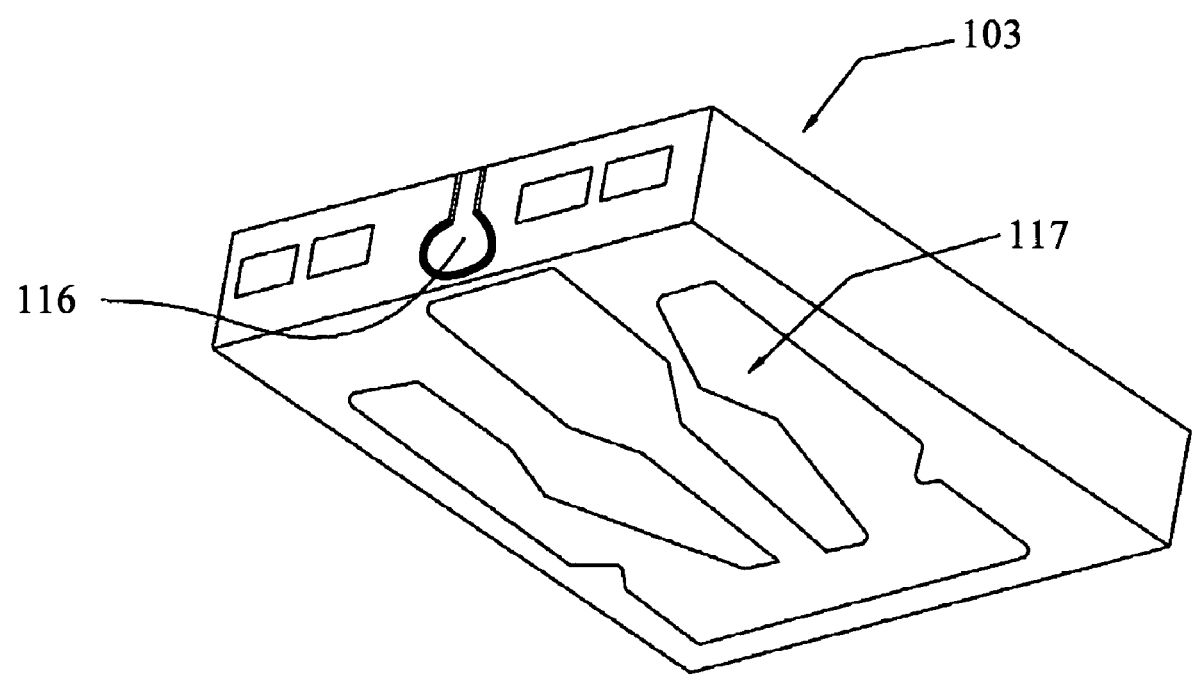
Figure 2A:
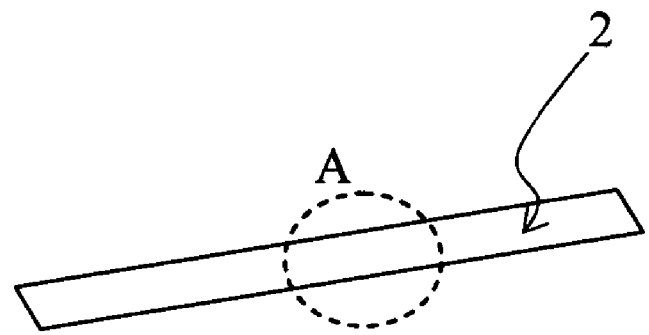
FIG. 2a is a perspective view of a slider row bar used in a slider row bar bonding process.
Figure 2B:
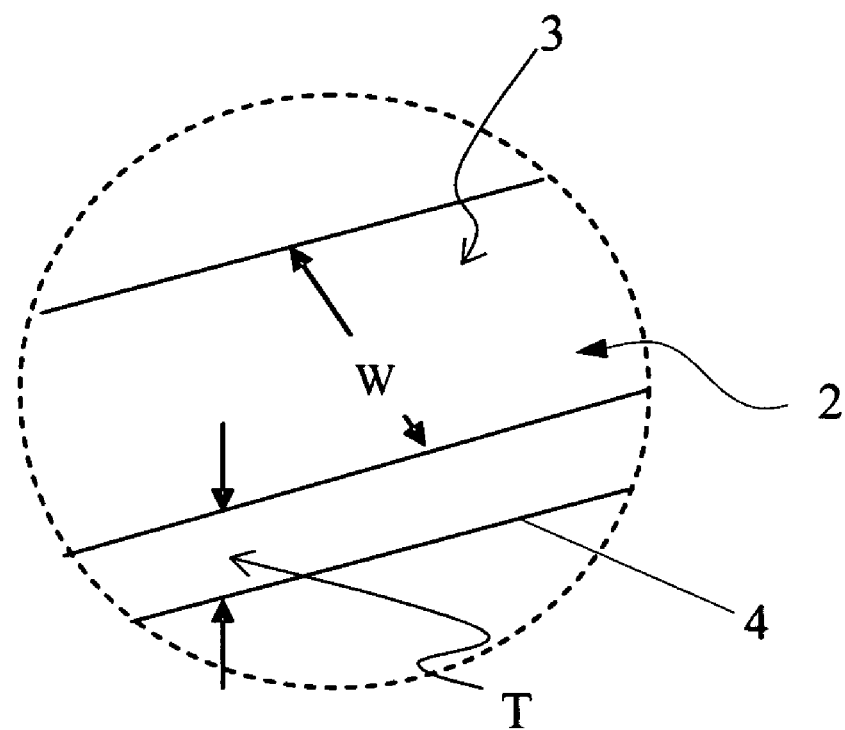
Figure 3:
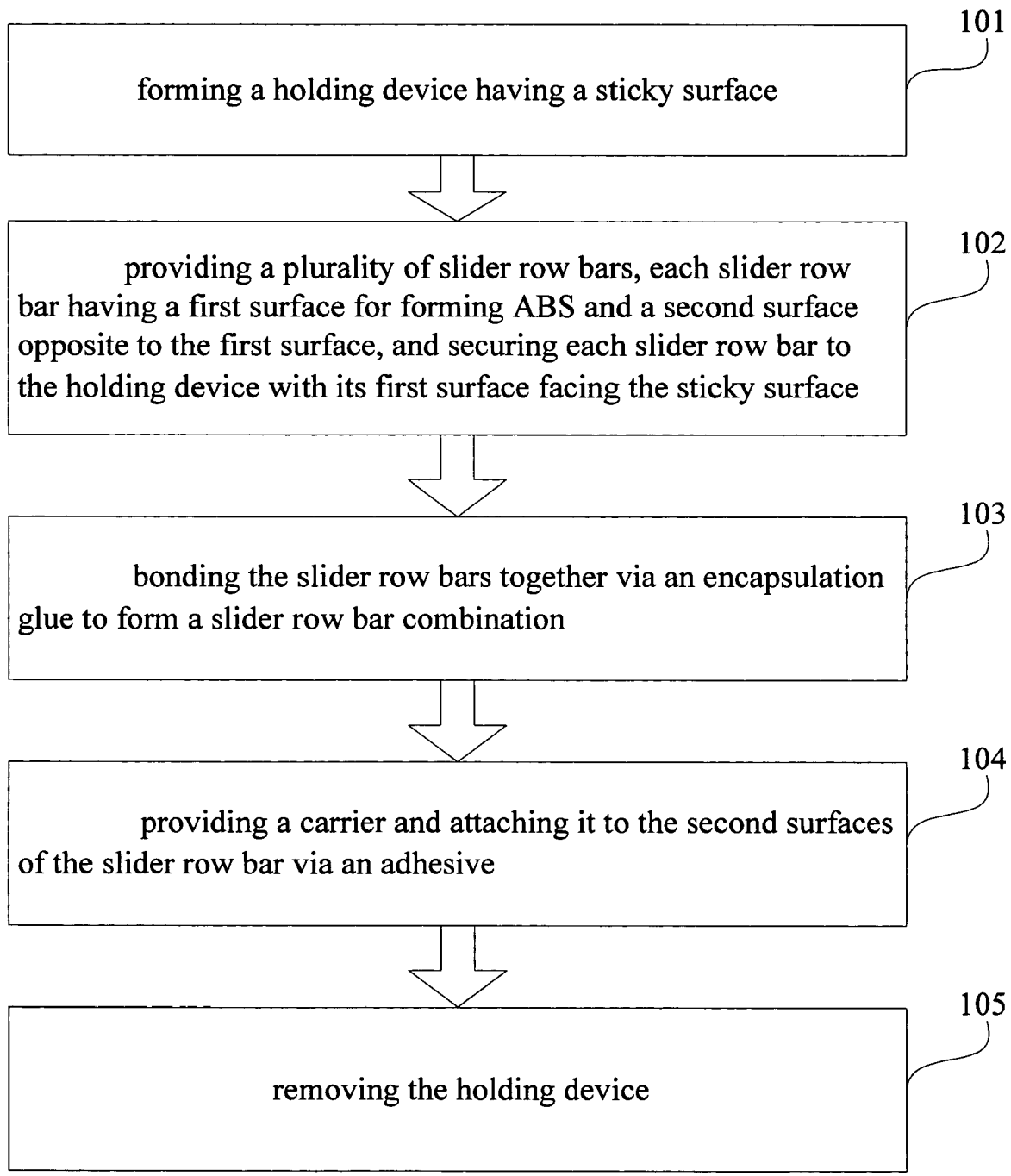
FIG. 3 shows a flowchart illustrating a conventional method for bonding slider row bars together.
Figure 4:
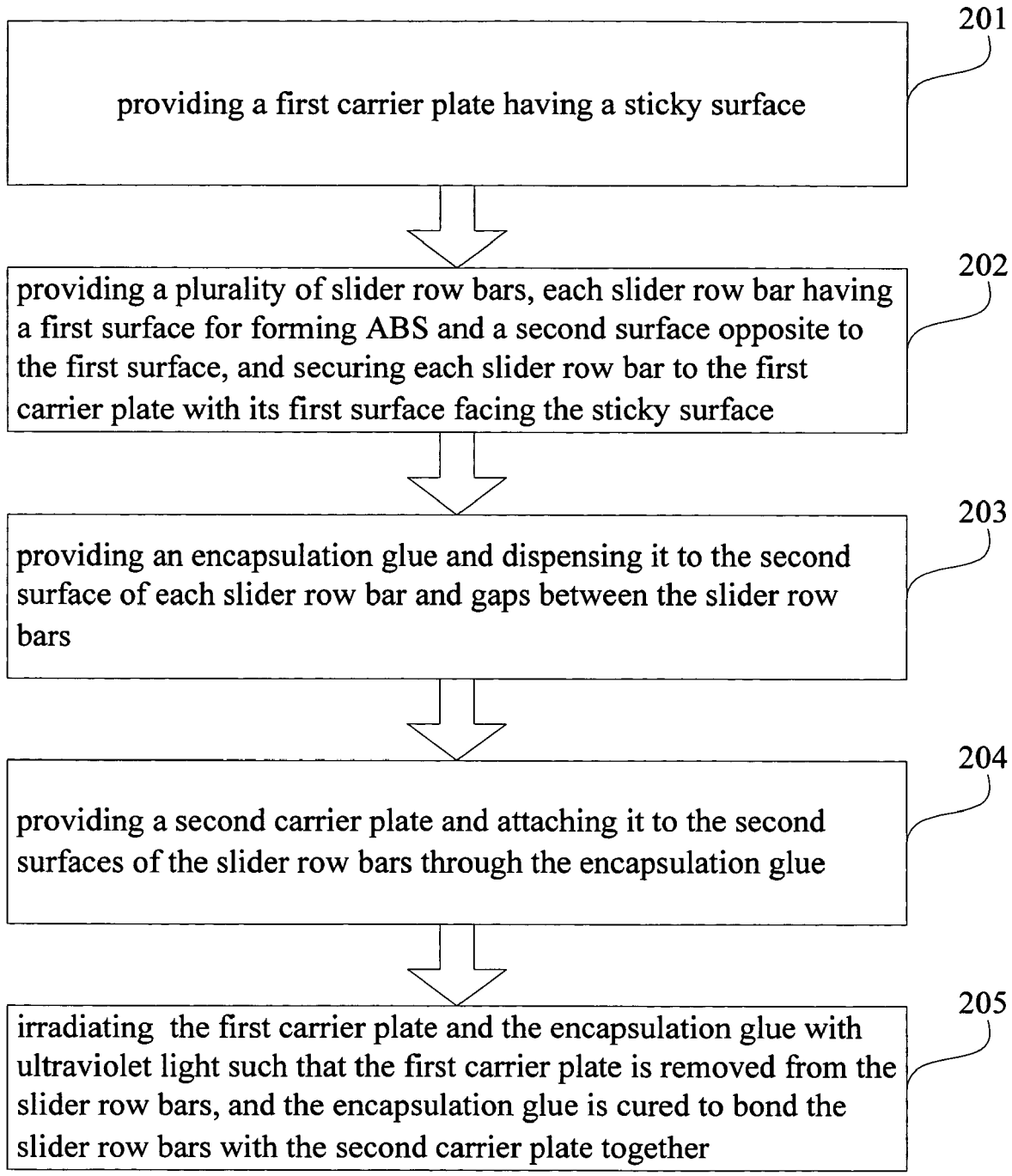
FIG. 4 shows a flowchart illustrating a method for bonding slider row bars together according to an embodiment of the invention.

Now, according to an embodiment of the invention, a method for bonding a plurality of slider row bars together for photolithography process is described. FIG. 4 illustrates a method for bonding a plurality of slider row bars together according to an embodiment of the invention. As illustrated, the method comprises the steps of: firstly, providing a first carrier plate having a sticky surface (step 201); then, providing a plurality of slider row bars, each slider row bar having a first surface for forming ABS and a second surface opposite to the first surface, and securing each slider row bar to the first carrier plate with its first surface facing the sticky surface (step 202); next, providing an encapsulation glue and dispensing it to the second surface of each slider row bar and gaps between the slider row bars (step 203); after that, providing a second carrier plate and attaching it to the second surfaces of the slider row bars through the encapsulation glue (step 204); irradiating the first carrier plate and the encapsulation glue with ultraviolet light such that the first carrier plate is removed from the slider row bars, and the encapsulation glue is cured to bond the slider row bars with the second carrier plate together (step 205).

Figure 5A:
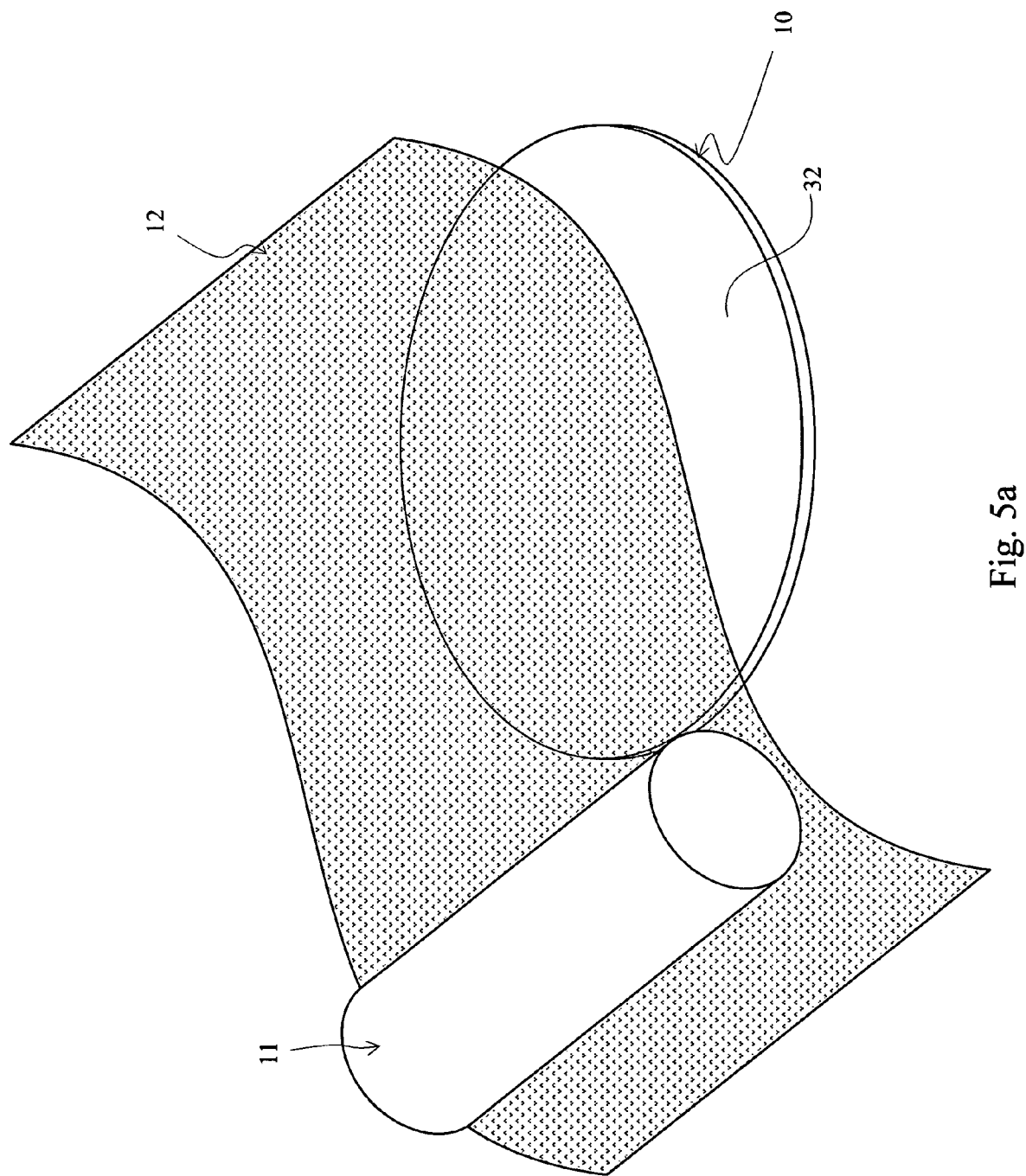
FIGS. 5a-5c are sequential views, illustrating a process of providing a first carrier plate used for temporarily mounting a plurality of slider row bar thereon.
Figure 5B:
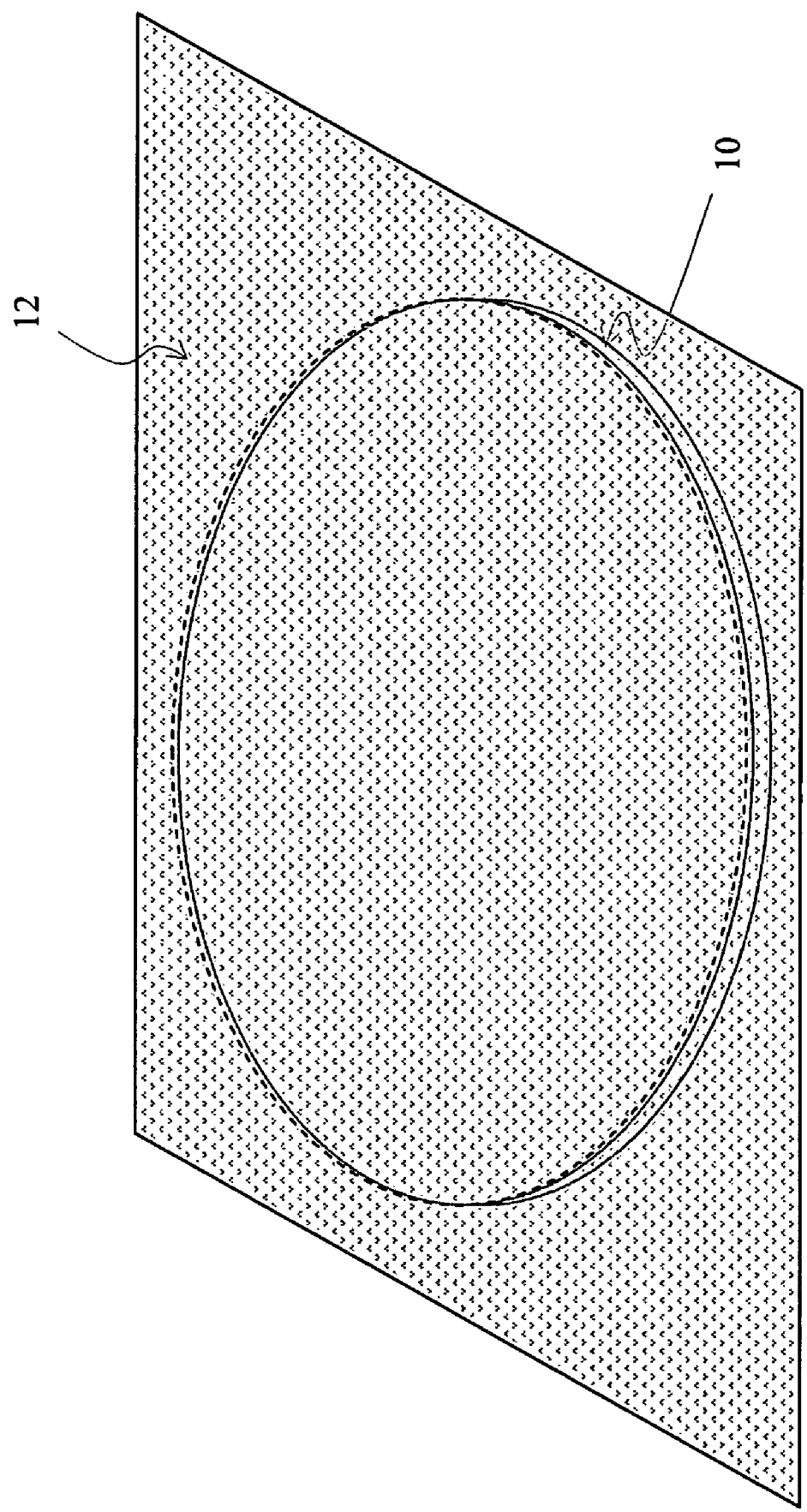
Figure 5C:
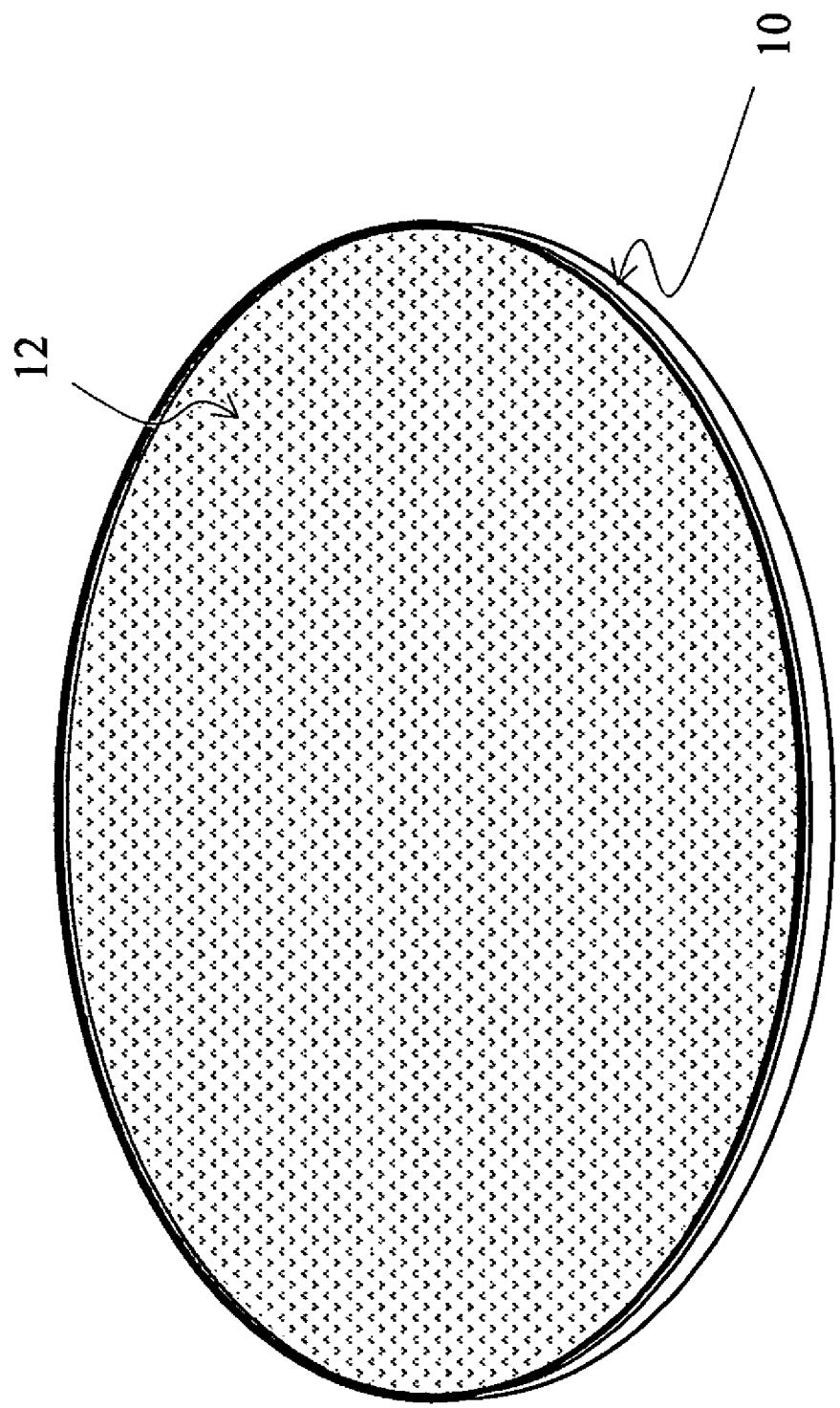

FIGS. 5a-5c shows the step 201. Firstly, as shown in FIG. 5a, a first carrier plate 10 with a datum surface 32 is provided. Ultraviolet light can pass through the first carrier plate 10. Then, an adhesive film 12 is laminated onto the datum surface 32 of the first carrier plate 10 by a suitable tool for example a laminating device 11. The adhesive film 12 is of a photosensitive film, namely, when exposed to a particular kind of light such as ultraviolet light, the adhesive film 12 will lose stickiness. Finally, as shown in FIG. 5b, a part of the adhesive film 12 is cut off around the perimeter of the first carrier plate 10 such that a first carrier plate 10 having an adhesive film 12 is formed as that shown in FIG. 5c. In this situation, the adhesive film 12 serves as the sticky surface of the first carrier plate 10 for temporarily attaching a plurality of slider row bars thereon (will be described next). In addition, the first carrier plate 10 functions as a temporary tool for temporarily securing a plurality of slider row bars and, when the manufacturing process ends, the first carrier plate 10 is removed.

Figure 6C:
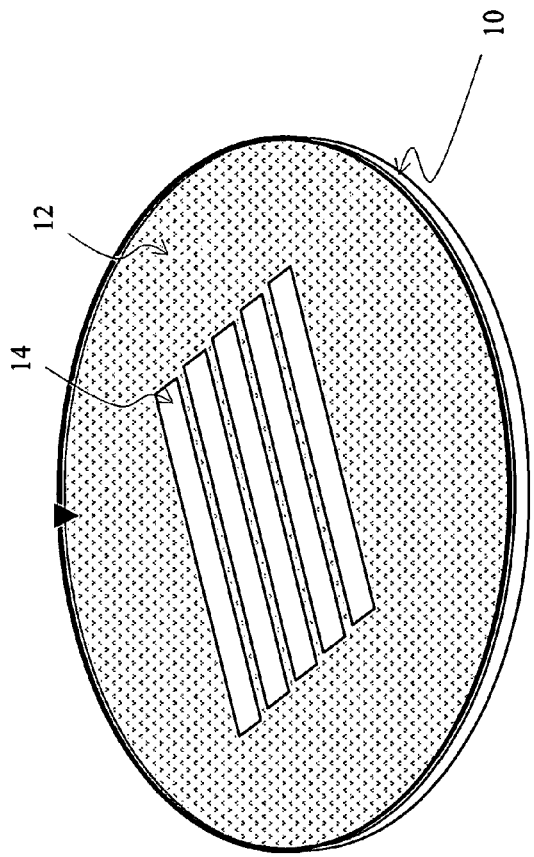

FIGS. 6a-6c shows the step 202. As illustrated, a plurality of slider row bars 14 is provided. Each slider row bar 14 has a width W1 and thickness T1. Each slider row bar 14 comprises a first surface 15 (also refer to FIG. 7d) for forming an air bearing surface (ABS) and a second surface 152 opposite to the first surface 15. Then, the slider row bars 14 are transferred to the first carrier plate 10 one by one via a suitable tool for example a vacuum pickup head 13, such that the first surfaces 15 of the slider row bars 14 are stick to the adhesive film 12, thus forming an arrangement as that shown in FIG. 6c. It is noted though only five slider row bars are shown in the figure; however, other number of slider row bars may be used depending upon production type and production ability.

Figure 7A:
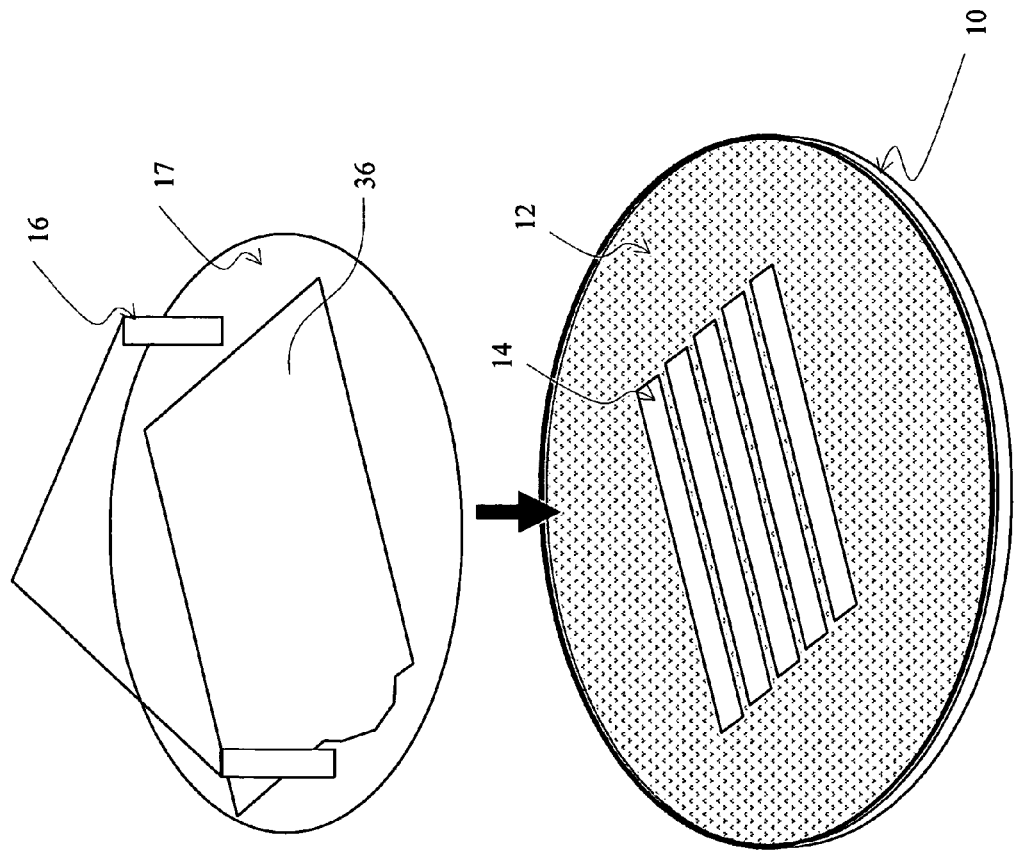
FIGS. 7a-7d are sequential views, illustrating a process of encapsulating the plurality of slider row bars together, the slider row bars having been carried on the first carrier plate during the process shown in FIGS. 6a-6c.
Figure 7B:
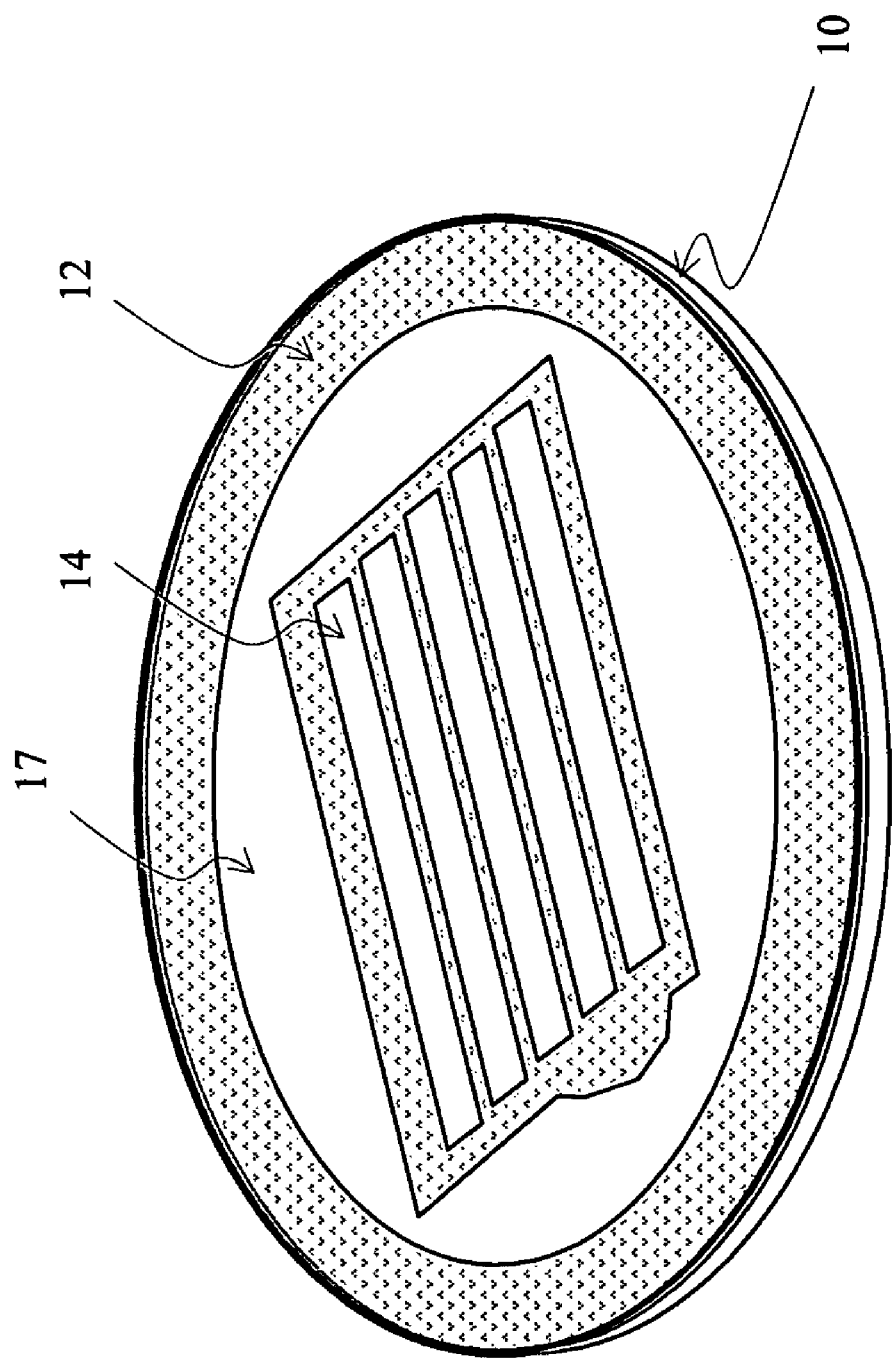
Figure 7C:
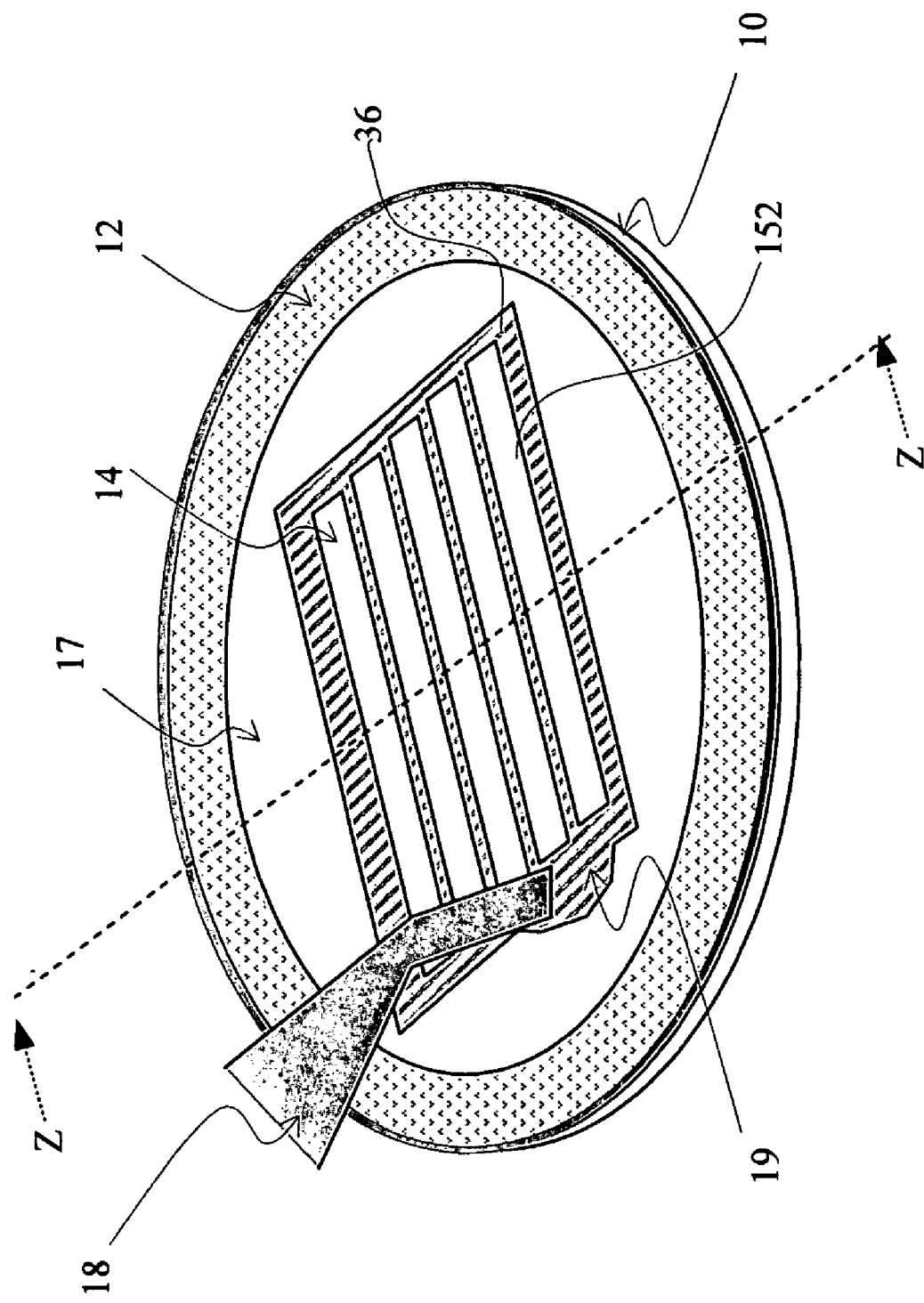
Figure 7D:
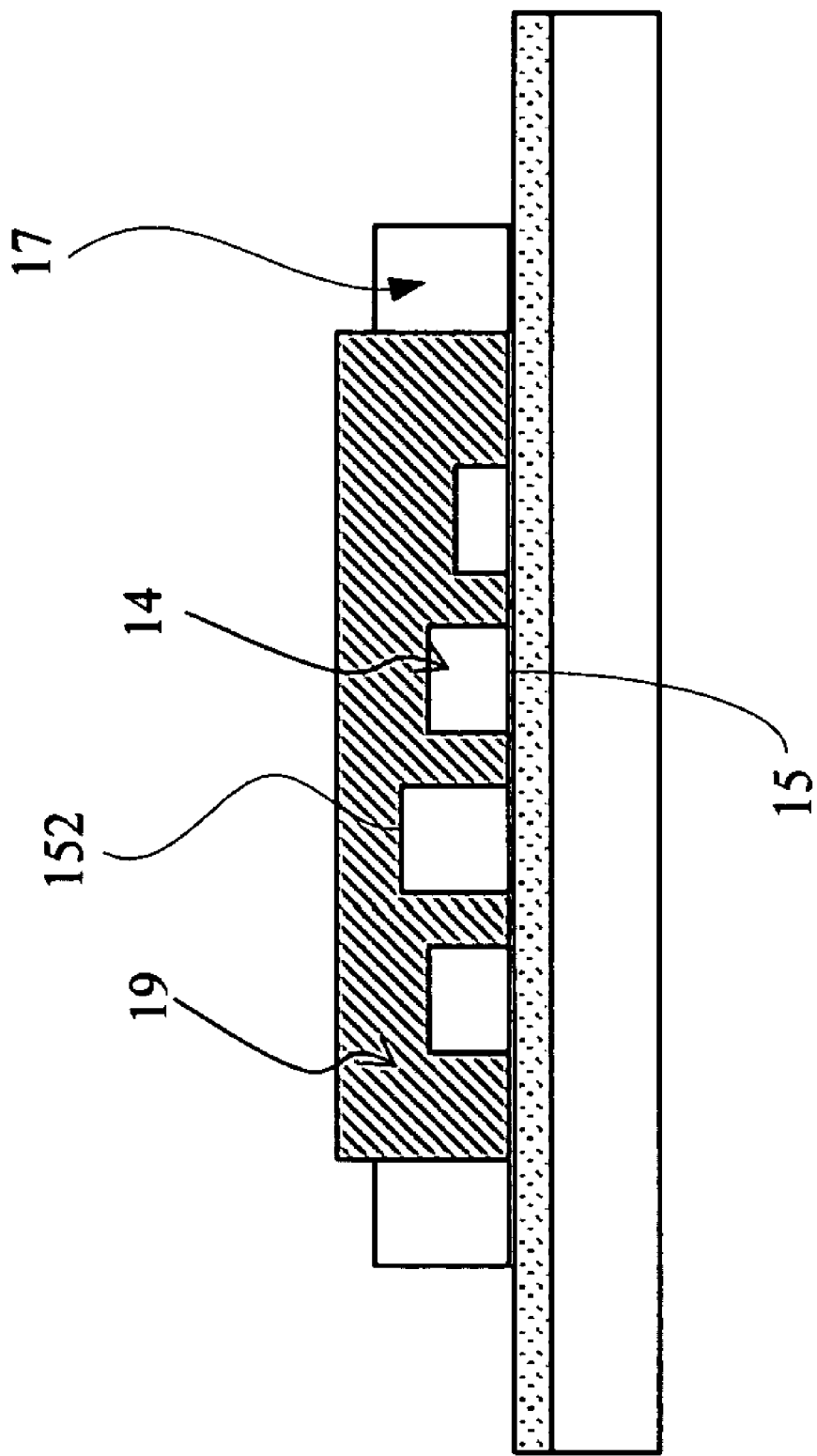

FIGS. 7a-7d shows the step 203. As shown in FIG. 7a, firstly, an auxiliary encapsulation plate 17 having an opening 36 is attached onto the adhesive film 12 of the first carrier plate 10 by a vacuum pickup head 16, making the slider row bars 14 exposed from the opening 36, thus forming structure as that shown in FIG. 7b. Next, as shown in FIG. 7c, an encapsulation glue such as photo-sensitive ultraviolet (UV)-curing glue 19 is dispensed into the opening 36 of the auxiliary encapsulation plate 17 using a glue dispenser 18, so that the UV-curing glue 19 flows into gaps (not labeled) between the slider row bars 14 and on the second surfaces 152 of the slider row bars 14. FIG. 7d illustrates a cross-sectional view of the structure of FIG. 7c along line Z-Z. As shown in the figure, the UV-curing glue 19 is filled in the gaps formed between the opening 36 and the slider row bars 14 and formed between the slider row bars 14. The UV-curing glue 19 is also covered on the second surfaces 152 of the slider row bars 14.

Here, the auxiliary encapsulation plate 17 is preferably made of ceramic, stainless steel, polymer or reinforced plastic for providing sufficient structural stiffness so as to withstand thermal deformation caused by high temperature (for example higher than 60 Celsius degree) generated during curing of the UV-curing glue 19 in a subsequent process (UV irradiation). In addition, the opening 36 is not limited to a square shape as shown in the figure, but other suitable shape of opening capable of containing the slider row bars 14 may also be used. Moreover, dispensation of the UV-curing glue 19 can be expedited by adjusting nozzle size, dispensing pressure and speed of the dispenser 18, thereby speeding up the whole manufacturing process.

Figure 8A:
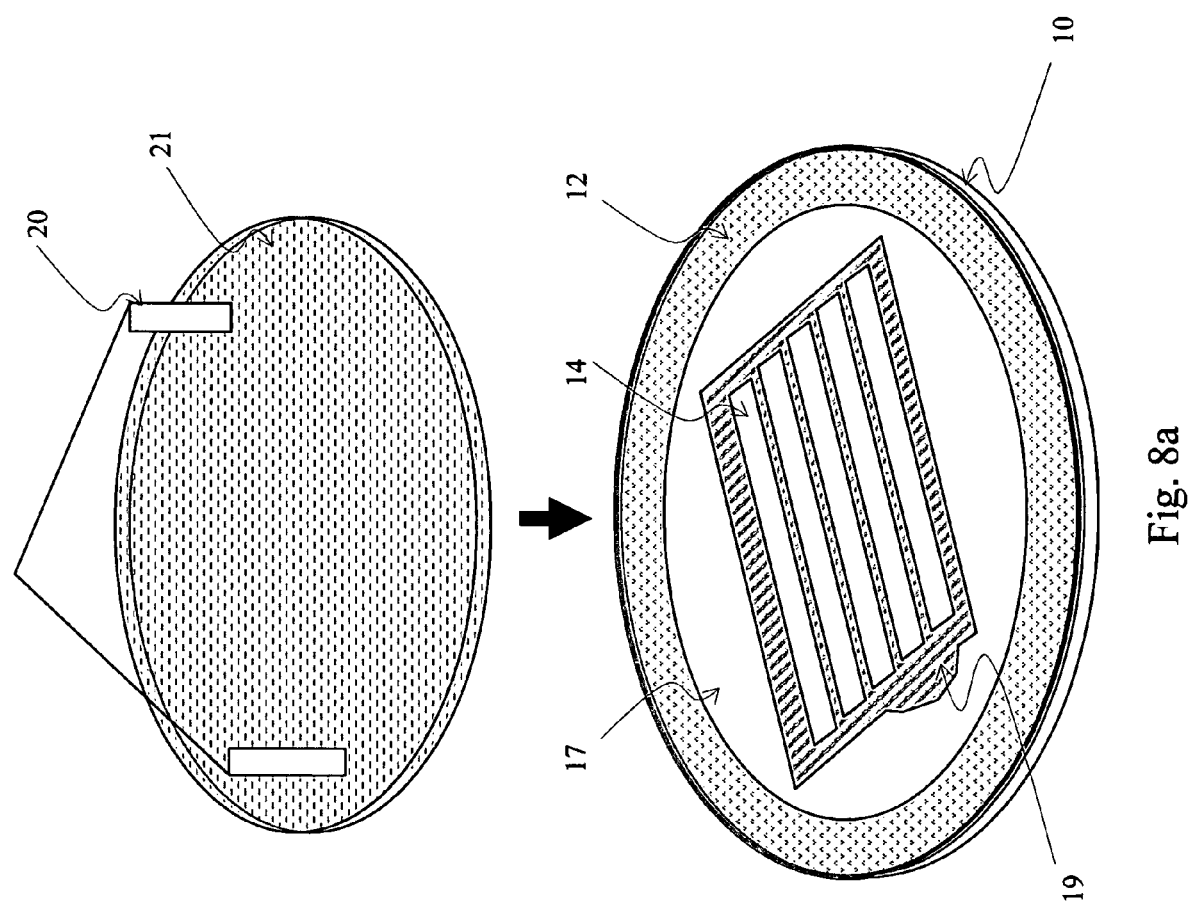
FIGS. 8a-8c show a process of mounting a second carrier plate to second surfaces of the slider row bars.
Figure 8B:
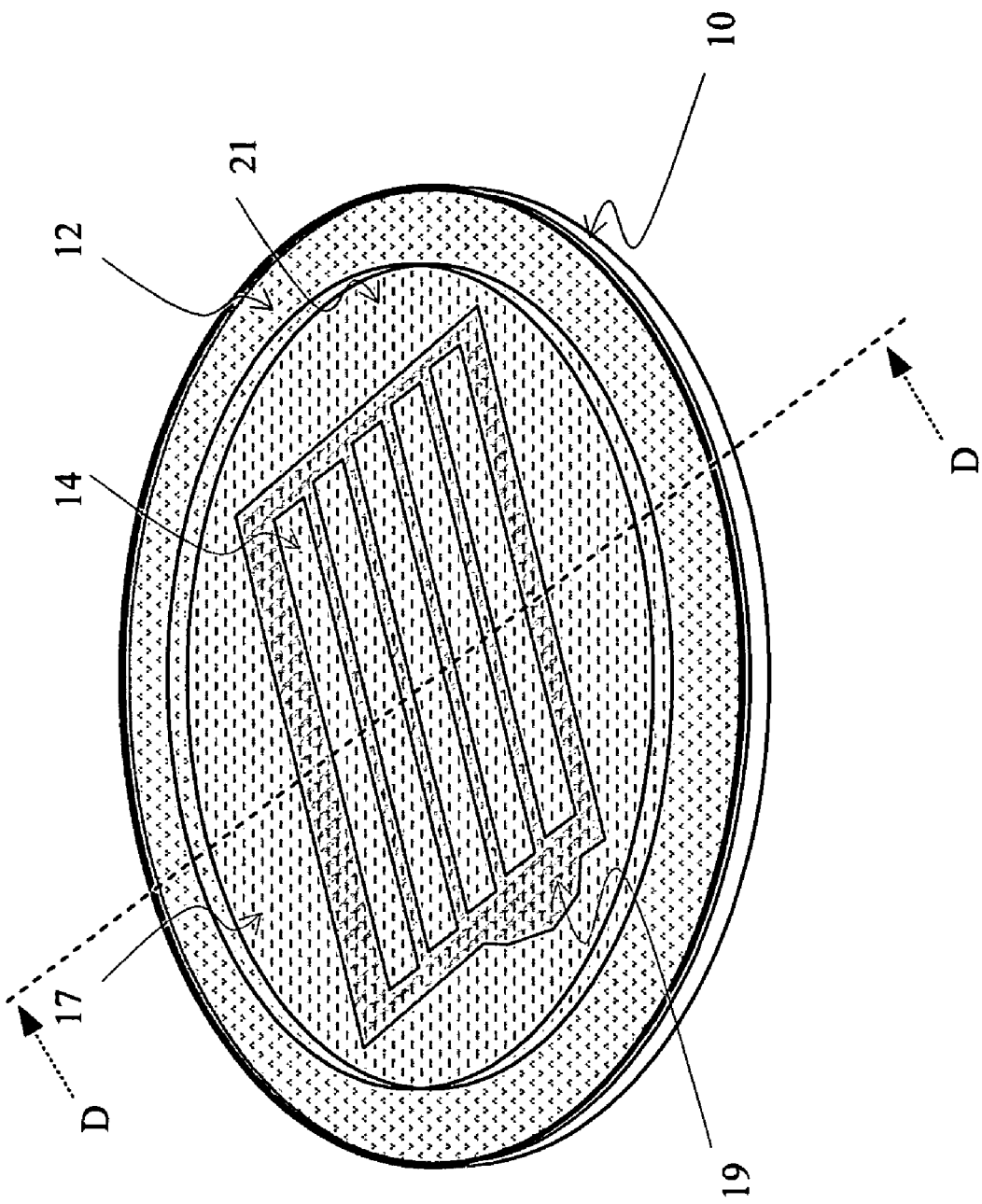
Figure 8C:
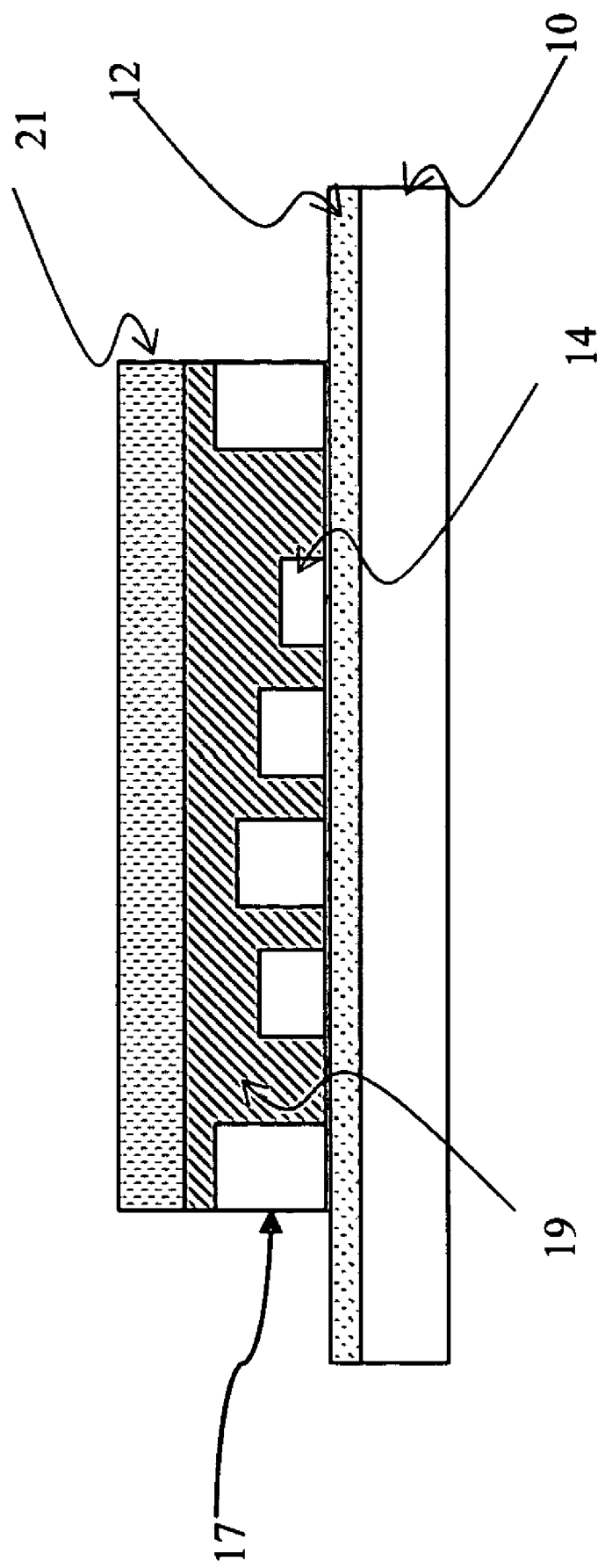

FIGS. 8a-8c show the step 204. In the step, a second carrier plate 21, through which ultraviolet light can pass, is placed to the second surfaces 152 of the slider row bars 14 via suitable device such as a vacuum pickup head 20, and then the second carrier plate 21 is attached to the second surfaces 152 of the slider row bars 14 by the UV-curing glue 19, while the slider row bars 14 are disposed on the adhesive film 12 of the first carrier plate 10. FIG. 8b illustrates a state after the second carrier plate 21 is attached to the second surfaces 152, and FIG. 8c illustrates a cross-sectional view of the structure of FIG. 8b along line D-D. Here, the second carrier plate 21 serves as a carrier of the slider row bars 14.

Figure 9A:
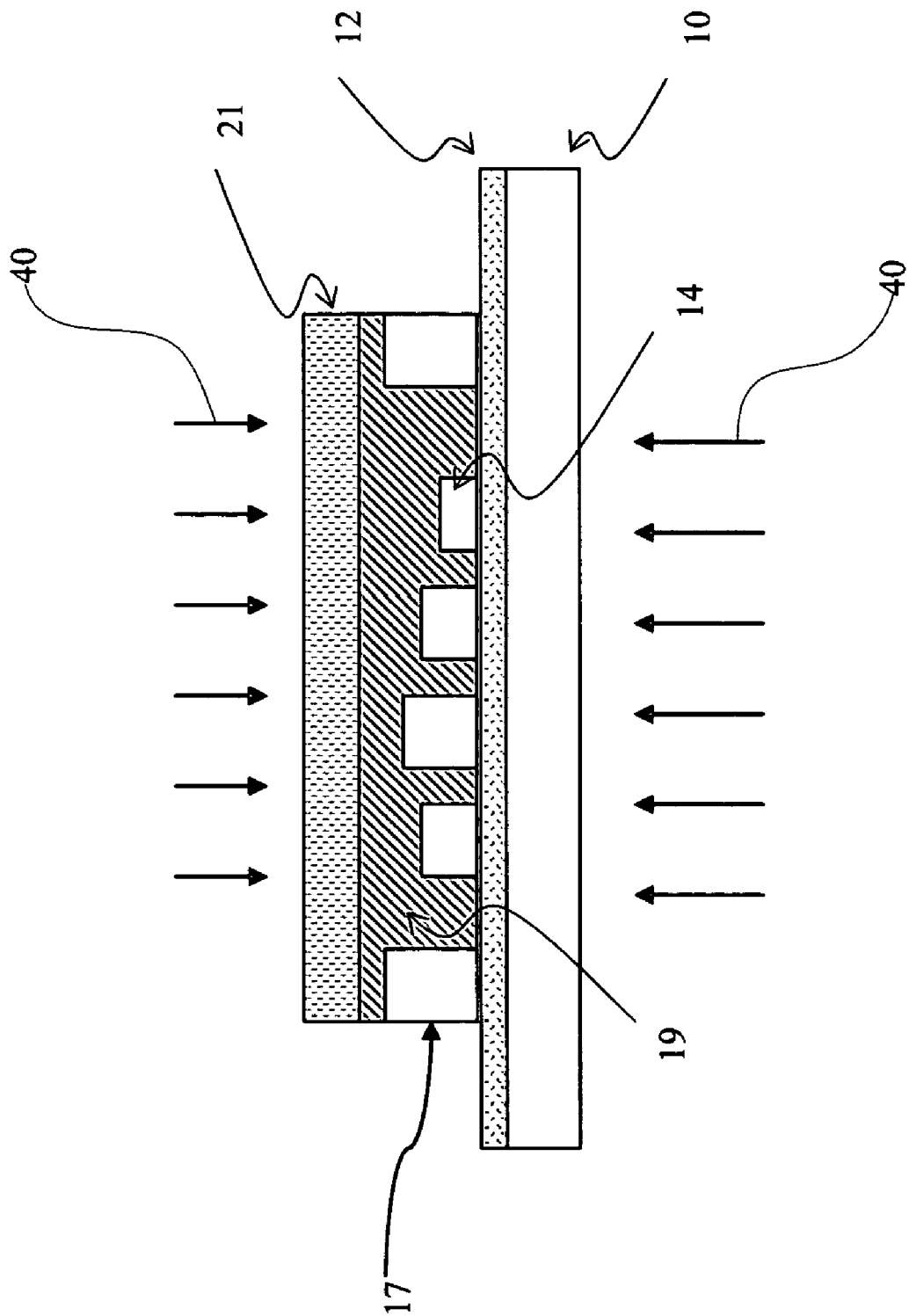
FIG. 9a shows a state of irradiating ultraviolet light to the first carrier plate and the encapsulation glue.

FIGS. 9a-9b illustrate the step 205. In the step, firstly, ultraviolet light 40 passes through the first carrier plate 10 and irradiates on the adhesive 12 thereof; in addition, the ultraviolet light 40 passes through the second carrier plate 21 and irradiates on the UV-curing glue 19 at the same time. In this embodiment, as the first carrier plate 10 and the second carrier plate 21 are both made of material, through which ultraviolet light can pass, the ultraviolet light 40 passes through the first carrier plate 10 and the second carrier plate 21 and then irradiates on the adhesive 12 and the UV-curing glue 19. The irradiation makes the UV-sensitive adhesive 12 lose stickiness such that the first carrier plate 10 is unstuck from the slider row bars 14, while the UV-curing glue 19 cured completely after a while, thus enabling the second carrier plate 21, the auxiliary encapsulation plate 17 and all the slider row bars 14 encapsulated with each other. After that, the adhesive 12 along with the first carrier plate 10 is removed, thus forming an encapsulation body 900 consisting of the second carrier plate 21, the auxiliary encapsulation plate 17, and the UV-curing glue 19 and all the slider row bars 14, as shown in FIG. 9b.

Figure 10:
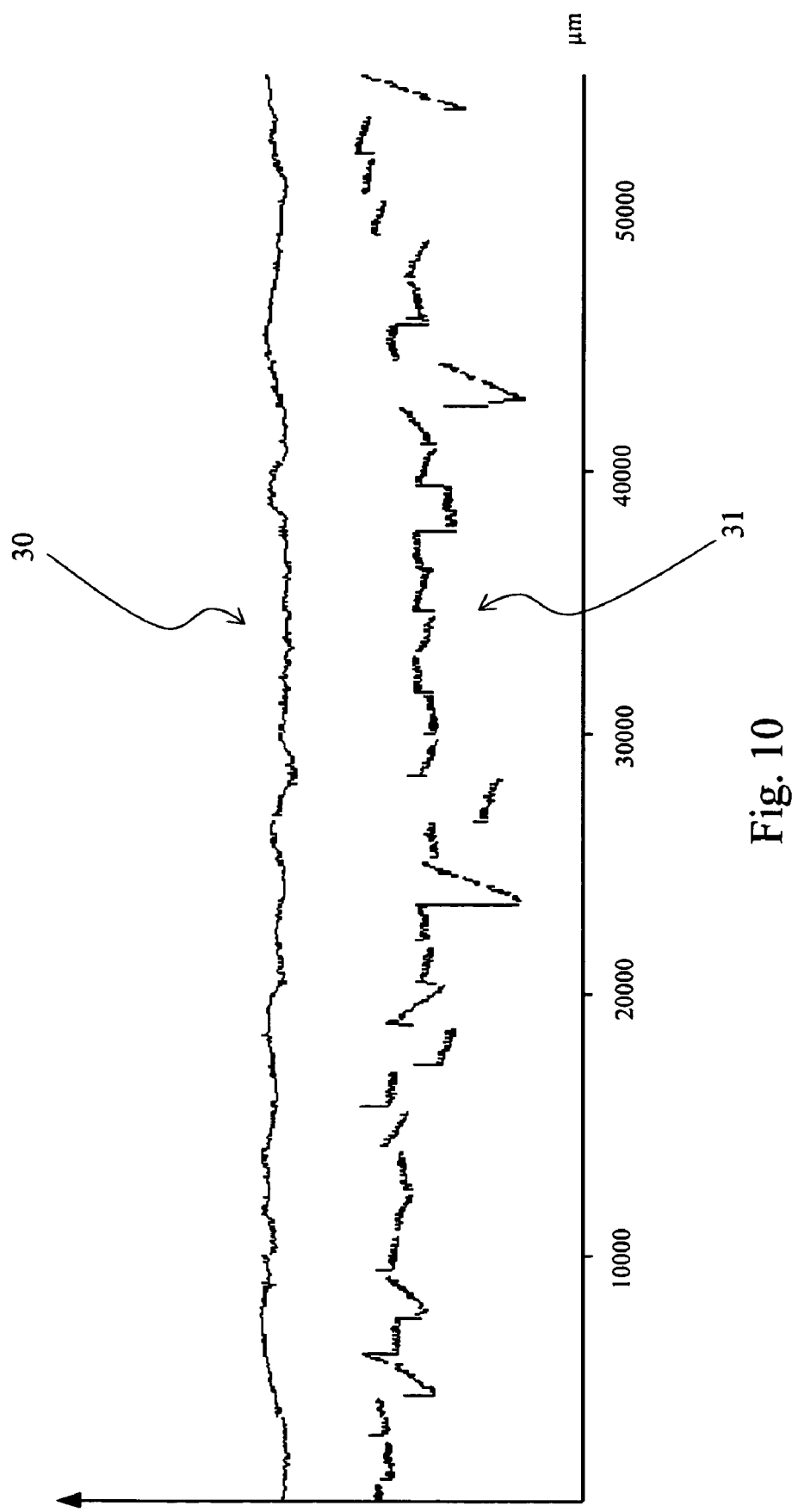
FIG. 10 shows two surface scanning characteristics of two slider row bar assembles respectively formed by the conventional method and the present method illustrated in an embodiment of the invention.

FIG. 10 shows surface scanning characteristics of the ABS-forming surfaces of the slider row bar assembles formed by conventional method and method of the invention respectively. As illustrated, curve 30, which represents surface scanning characteristics of the slider row bar assembly of the invention, is smoother greatly than curve 31, which represents surface scanning characteristics of the slider row bar assembly of conventional method. In other words, utilizing the method of the invention can obtain a more ideal overall surface flatness of the slider row bar assembly than the conventional method.

Compared with conventional method, as the method of the invention utilizes the ABS forming surface of the slider row bar as the datum surface, all the ABS forming surfaces are always in a same plane during the whole manufacturing process, and accordingly, a high overall flatness is obtained, thus improving manufacturing precision of slider ABS. Furthermore, since connection between the slider row bars and the temporary carrying tool (the first carrier plate 10 with the sticky surface) is eliminated by UV irradiation which has little damage to the slider bodies, but not by solution-immersing method, damage to the slider bodies is reduced or avoided during the manufacturing process. Furthermore, as the process of bonding the slider row bars together occurs at the same time as that of bonding the slider row bars with the second carrier plate 21, the entire work time is decreased and production efficiency is improved.

Figure 11:
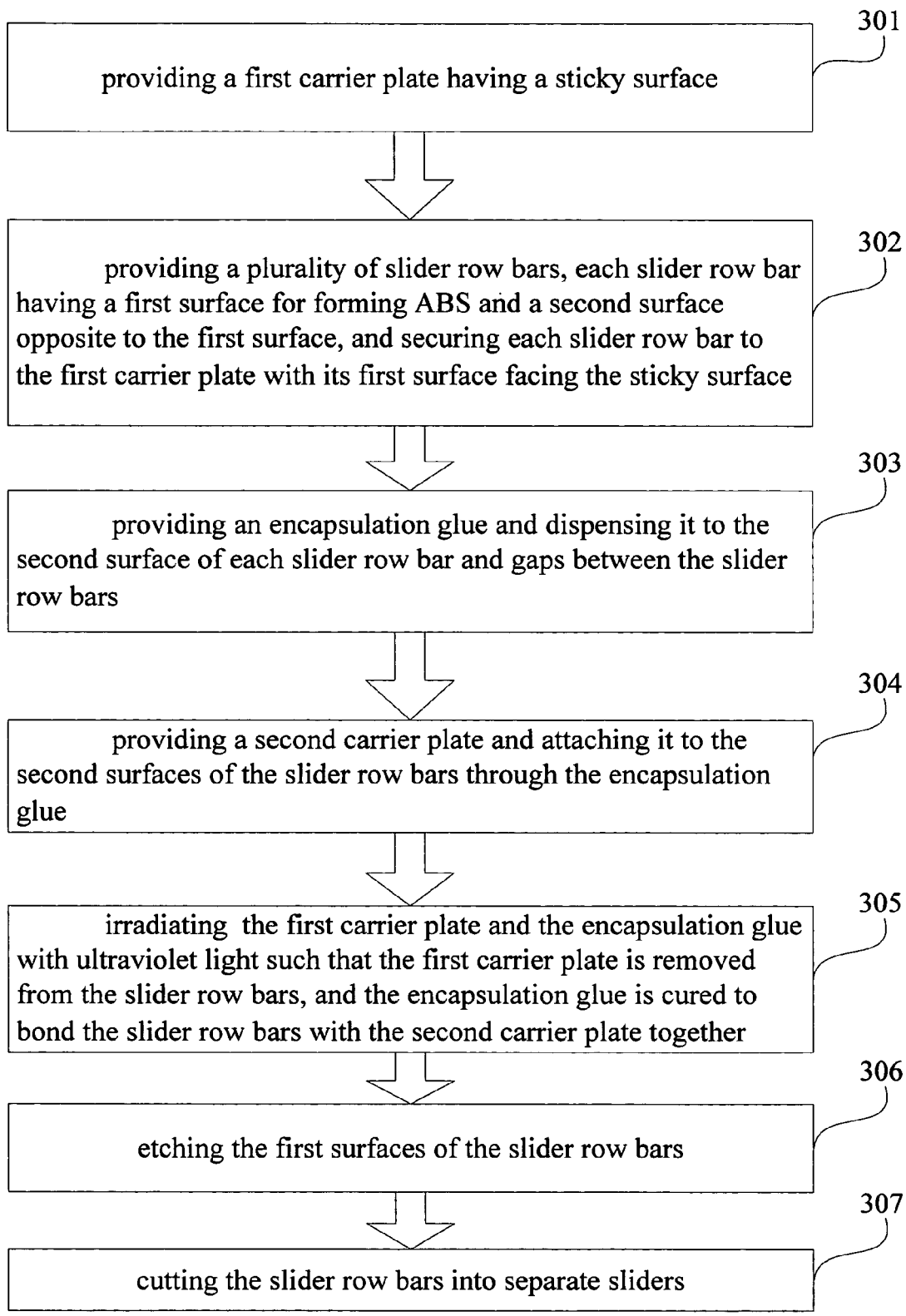
FIG. 11 shows a flowchart illustrating a slider manufacturing process according to an embodiment of the invention.

Referring to FIG. 11, according to an embodiment of the invention, a method for manufacturing sliders comprises the steps of: providing a first carrier plate having a sticky surface (step 301); providing a plurality of slider row bars, each slider row bar having a first surface for forming ABS and a second surface opposite to the first surface, and securing each slider row bar to the first carrier plate with its first surface facing the sticky surface (step 302); providing an encapsulation glue and dispensing it to the second surface of each slider row bar and gaps between the slider row bars (step 303); providing a second carrier plate and attaching it to the second surfaces of the slider row bars through the encapsulation glue (step 304); irradiating the first carrier plate and the encapsulation glue with ultraviolet light such that the first carrier plate is removed from the slider row bars, and the encapsulation glue is cured to bond the slider row bars with the second carrier plate together (step 305); etching the first surfaces of the slider row bars (step 306); cutting the slider row bars into separate sliders (step 307).

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method for bonding slider row bars for a photolithography process, the method comprising:
   (1) providing a first carrier plate having a sticky surface;
   (2) providing a plurality of slider row bars, each slider row bar having a first surface for forming air bearing surface and a second surface opposite to the first surface, and arranging each slider row bar on the first carrier plate one by one via a tool with its first surface facing the sticky surface;
   (3) providing an encapsulation glue and dispensing the glue to the second surface of each slider row bar and gaps between the slider row bars;
   (4) providing a second carrier plate and attaching the second carrier plate to the second surfaces of the slider row bars through the encapsulation glue; and
   (5) irradiating the first carrier plate and the encapsulation glue with ultraviolet light so that the first carrier plate is removed from the slider row bars, and the encapsulation glue is cured to bond the slider row bars with the second carrier plate together.

2. The method according to claim 1, wherein step (1) comprises:
   (a) providing a first carrier plate having the datum surface;
   (b) laminating an adhesive film on the datum surface as the sticky surface of the first carrier plate; and
   (c) removing the adhesive film along the perimeter of the first carrier plate.

3. The method according to claim 2, wherein step (3) comprises:
   (i) attaching an auxiliary encapsulation plate having an opening to the adhesive film of the first carrier plate, such that the slider row bars are exposed from the opening; and
   (ii) providing the encapsulation glue and dispensing the glue into the opening to make the encapsulation glue flow to the second surfaces of the slider row bars and gaps between the slider row bars.

4. The method according to claim 3, wherein the encapsulation glue is ultraviolet-curing glue.

5. The method according to claim 3, wherein the auxiliary encapsulation plate is made of a material is selected from a group consisting of ceramic, stainless steel, polymer and plastic.

6. The method according to claim 3, wherein step (5) comprises:
   irradiating the first carrier plate and the encapsulation glue with the ultraviolet light so as to make the adhesive film of the first carrier plate lose stickiness, and make the encapsulation glue being cured to bond the slider row bars with the second carrier plate together; and
   removing the first carrier plate from the slider row bars.

7. The method according to claim 6, wherein the adhesive film is photosensitive film.

8. The method according to claim 3, wherein the adhesive film is photosensitive film.

9. The method according to claim 2, wherein the adhesive film is photosensitive film.

10. A method of manufacturing sliders, the method comprising:
    (1) providing a first carrier plate having a sticky surface;
    (2) providing a plurality of slider row bars, each slider row bar having a first surface for forming air bearing surface and a second surface opposite to the first surface, and arranging each slider row bar on the first carrier plate one by one via a tool with its first surface facing the sticky surface;
    (3) providing an encapsulation glue and dispensing the glue to the second surface of each slider row bar and gaps between the slider row bars;
    (4) providing a second carrier plate and attaching the second carrier plate to the second surfaces of the slider row bars through the encapsulation glue;
    (5) irradiating the first carrier plate and the encapsulation glue with ultraviolet light so that the first carrier plate is removed from the slider row bars, and the encapsulation glue is cured to bond the slider row bars with the second carrier plate together;
    (6) etching the first surfaces of the slider row bars; and
    (7) cutting the slider row bars into separate sliders.

11. The method according to claim 10, wherein step (1) comprises:
    (a) providing the first carrier plate having a datum surface;
    (b) laminating an adhesive film on the datum surface as the sticky surface of the first carrier plate; and
    (c) removing the adhesive film along the perimeter of the first carrier plate.

12. The method according to claim 11, wherein step (3) comprises:
    (i) attaching an auxiliary encapsulation plate having an opening to the adhesive film of the first carrier plate, so that the slider row bars are exposed from the opening; and
    (ii) providing the encapsulation glue and dispensing the glue into the opening to make the encapsulation glue flow to the second surfaces of the slider row bars and gaps between the slider row bars.

13. The method according to claim 12, wherein step (5) comprises steps of:
    irradiating the first carrier plate and the encapsulation glue with the ultraviolet light to make the adhesive film of the first carrier plate lose stickiness, and make the encapsulation glue being cured to bond the slider row bars with the second carrier plate together; and
    removing the first carrier plate from the slider row bars.

* * * * *